(12) United States Patent
Wechlin et al.

(10) Patent No.: US 8,807,309 B2
(45) Date of Patent: Aug. 19, 2014

(54) DEVICE AND METHOD FOR INDUCTIVELY TRANSMITTING ELECTRIC ENERGY TO DISPLACEABLE CONSUMERS

(75) Inventors: Mathias Wechlin, Kandern (DE); Andrew Green, Malsburg-Marzell (DE)

(73) Assignee: Conductix-Wampfler AG, Weil Am Rhein (DE)

( * ) Notice: Subject to any disclaimer, the term of this patent is extended or adjusted under 35 U.S.C. 154(b) by 182 days.

(21) Appl. No.: 13/393,929

(22) PCT Filed: Jul. 21, 2010

(86) PCT No.: PCT/EP2010/060565
§ 371 (c)(1),
(2), (4) Date: May 14, 2012

(87) PCT Pub. No.: WO2011/026688
PCT Pub. Date: Mar. 10, 2011

(65) Prior Publication Data
US 2012/0267209 A1    Oct. 25, 2012

(30) Foreign Application Priority Data

Sep. 3, 2009 (DE) .......................... 10 2009 039 975

(51) Int. Cl.
*B60L 5/00* (2006.01)
(52) U.S. Cl.
CPC ........................................ *B60L 5/00* (2013.01)
USPC ........................................................ 191/10
(58) Field of Classification Search
CPC ............. H02J 17/00; B60L 5/00; B60L 9/16; B60M 7/00
USPC ........................................................... 191/10
See application file for complete search history.

(56) References Cited

U.S. PATENT DOCUMENTS 7,109,602 B2   9/2006 Nishino
7,258,309 B2   8/2007 Ehrsam (Continued)

FOREIGN PATENT DOCUMENTS

DE   69415794 T2   8/1999
DE   60202141      12/2005

(Continued)

OTHER PUBLICATIONS

English translation of International Preliminary Report on Patentability dated Mar. 20, 2012 for PCT/EP2010/060565 filed Jul. 21, 2010.

(Continued)

*Primary Examiner* — Zachary Kuhfuss
(74) *Attorney, Agent, or Firm* — Fleit Gibbons Gutman Bongini & Bianco PL; Martin Fleit; Paul D. Bianco

(57) ABSTRACT

The invention relates to a device for inductively transmitting electrical energy to displaceable consumers (F1-F13) that can be moved along a track, having a primary conductor arrangement (2) divided into route segments (3-7) that are electrically separated from each other, and extending along the track, wherein individual route segments (3-7) are each associated with at least one current source (3'-7') for imprinting a continuous current into each of the route segments (3-7), and to a corresponding method. The aim of the invention is to supply the displaceable consumers in an energy-saving manner with electric energy matched to demand, and to allow short reaction times when operating the device. This aim is achieved by providing the device with a means (11) for determining the total power of the displaceable consumers (F1-F13) present in each of the individual route segments (3-7) and with a means (11) for actuating the current sources (3'-7') for applying the electrical continuous current corresponding to the total power required for each route segment (3-7), or by determining, according to the method, the required total power of the displaceable consumers (F1-F13) present in each route segment and applying an electrical continuous current to each route segment (3-7) by means of the associated current source (3'-7'), said current corresponding to the total power required therein.

8 Claims, 2 Drawing Sheets

(56) References Cited

U.S. PATENT DOCUMENTS

| | | |
|---|---|---|
| 2004/0119340 A1 | 6/2004 | Nishino |
| 2005/0005813 A1 | 1/2005 | Ehrsam |

FOREIGN PATENT DOCUMENTS

| | | |
|---|---|---|
| DE | 102006013004 A1 | 1/2007 |
| DE | 60125579 T2 | 10/2007 |
| DE | 102007026896 A1 | 12/2008 |
| JP | 11-018205 | 1/1999 |
| JP | H118904 | 1/1999 |
| JP | 2000184503 | 6/2000 |
| JP | 2011158258 | 6/2001 |
| JP | 2002281613 | 9/2002 |
| JP | 2002351546 | 12/2002 |
| JP | 2003209903 | 7/2003 |
| WO | 93/23909 A1 | 11/1993 |
| WO | 2007/006400 A2 | 1/2007 |

OTHER PUBLICATIONS

English translation of Written Opinion dated Mar. 15, 2012 for PCT/EP2010/060565 filed Jul. 21, 2010.

Japanese Office Action dated Sep. 3, 2013 for Japanese Patent Application No, 2012-527259.

International Search Report published Mar. 3, 2011 for PCT/EP2010/060565 filed Jul. 21, 2010.

DEVICE AND METHOD FOR INDUCTIVELY TRANSMITTING ELECTRIC ENERGY TO DISPLACEABLE CONSUMERS

FIELD OF THE INVENTION

The invention relates to a device for inductive transmission of electrical energy to moving consumers according to the preamble of claim 1 and to a method for this according to the preamble of claim 6.

BACKGROUND OF THE INVENTION

When electrical energy is transmitted to moving consumers, particularly in systems with consumers guided along a predetermined route such as telpher systems or driverless transport systems in assembly plants or warehouses with shelving, it is known for the complete route to be divided at least electrically into individual route sections. As a rule, the individual route sections are each supplied with electrical energy through their own supply modules. To increase the safety of unoccupied route sections and reduce the power requirement of known systems, usually only those route sections on which moving consumers are in operation are supplied with electrical energy.

Thus, DE 602 90 141 T2 discloses an automatic transport and personal guidance system and the control of transport modules in such a system with a track as guide device for the transport modules. In addition, this system comprises an electrical supply system with a distribution device for electrical supply for different successive supply circuits. The supply system controls the movement of the transport modules by making different supply circuits electrically live or dead. Here, when a transport module is present in a supply circuit, this prevents one or more circuits arranged directly behind the circuit being used from being made live in order to maintain a safety gap between the different transport modules travelling separately from one another on the track. This ensures automatic movement of the vehicles when the transport modules are supplied with electrical energy through the supply circuits. If the transport modules are not supplied with electrical energy by the supply circuits, a braking device is automatically tripped in the transport modules in these supply circuits.

DE 601 25 579 T2 discloses a contactless current supply device in which a primary induction line uses high-frequency current to transmit electrical energy without contact to a secondary load, the secondary load being a moving car which is assigned to a robot area. In order to be able to repair or service electrical equipment in the moving car, the corresponding section of the movement track can be switched off so that the car is not supplied with electrical voltage.

WO 93/23909 also describes a roadway for inductively supplying an automatic guided vehicle with a route which is divided into individual segments and is only supplied with energy when a vehicle is in this segment.

WO 2007/006400 A2 discloses a primary conductor divided in multiple sections which are not separated electrically from one another, whereby respective route controllers can be assigned to each section allowing each route section to be feed forward controlled, feed back controlled or both together. The different route sections do not contain respective current sources for impressing a constant current, but there is only one single supply circuit for supplying alternating current to the primary conductor, whereby the route controllers are enabled for data transmission with the supply circuit. The route controllers can transmit the number of consumers to be supplied in the respective route section and further information, for example the power required by the consumers and the capacity of energy contained in their energy buffers, to the supply circuit. On that basis the supply circuit is enabled to calculate the required power and the pulse with modulation ratio and/or the characteristic of the amplitude value of the current of the complete primary conductor and to impress this value correspondingly. Further, sinusoidal current blocks are impressed during an on-period. During an off-period the current in the primary conductor is switched off, whereby during that time period an energy buffer of the consumer supplies the necessary voltage. A power supply to different route sections based on the required power thereof is not possible.

DE 10 2007 026 896 A1 discloses a method for power-adaptive control of a generated transmission conductor current, which is impressed in a transmission route of an arrangement for inductive transmission of electrical power to at least two movable consumers. A transmission conductor shown therein is not divided into route sections with respective assigned current source for impressing a constant current into each respective section. Hence a power supply of different route sections dependent on the required power is not possible.

In installations in which a plurality of moving consumers travel over the different route sections at different times there is a desire to reduce the power requirement in a simple manner. Often the moving consumers carry out additional activities, for example turning, lifting or swivelling operations to raise loads or grip components. This results in a wide variety of requirements of the power required at the consumers. For example, a travelling consumer or vehicle only requires electrical power for its car control and its propulsion drive, whereas more electrical power is required for an additional turning movement. However, often such vehicles are also stationary in a waiting (standby) position, i.e. in this case it is only necessary to supply the car control with electrical power. Even when there are only stationary vehicles with a relatively low power requirement in a route section, in the known installations the maximum power requirement is maintained and a route section is only switched to a state in which it is free of current and voltage in the complete absence of vehicles. As installations of this kind are often operated with a constant current supply, the result is a constant high current in the current and voltage-carrying supply elements of the route sections, leading to continuous high power losses.

In the known installations if the power supply were also switched off in route sections in which all the vehicles are in a waiting (standby) position, the car controls of the vehicles in this route section would initially have to be started up when this route section is restarted, preventing rapid or immediate restarting of the vehicles. To avoid this, the vehicles could be equipped with a vehicle battery which guarantees the power required to maintain the operation of the car control even when the route section is switched off. However, if a vehicle is stationary for an extended period, the vehicle battery is discharged so that restarting is only possible with the time consuming start-up of the car control. To guarantee operation with optimum reliability and speed, it is then necessary either to provide a battery with a greater capacity or to supply the route section continuously with the full electric power as known.

SUMMARY OF THE INVENTION

Therefore, the underlying object of the present invention is to provide a device and a method for inductive transmission of electrical energy to moving consumers, which overcome the above-named disadvantages and allow an energy-saving supply of electrical energy to the moving consumers matching demand and short reaction times in the operation of the device.

The invention achieves this object with a device for inductive transmission of electrical energy to moving consumers with the features of claim 1 and with a method for this with the features of claim 6. Advantageous embodiments and expedient developments of the invention are disclosed in the subordinate claims.

According to the invention, a device named at the start for inductive transmission of electrical energy to moving consumers is characterised in that a means is provided for determining the total power required in each case in the individual route sections by the moving consumers located there and a means for actuating the current sources for impressing the constant electrical current corresponding to the required total power of the respective route section. According to the invention, a method named at the start for inductive transmission of electrical energy to moving consumers is characterized in that the total power required by the moving consumers located there is determined for each route section and a constant electrical current corresponding to the total power required there is impressed on the respective route section by the associated current source. This makes it possible to obtain a substantial reduction in the energy required by the device without any major effect on the operation of the device, as only the required power is provided in each case in the individual route sections, and so the power loss can be reduced.

In one advantageous embodiment of the invention, the means for determining the required total power can comprise an assignment table in which different supply levels of the required total power in a route section are assigned values of the constant current to be impressed in the route section. Advantageously, the values for the constant current can correspond to the greatest required total power in this supply level. In one advantageous variant of the method according to the invention, a supply level can be selected according to the determined required total power in a route section and a value for the constant current to be impressed assigned to the selected supply level in the route section can be impressed on the route section. This makes it possible to avoid continuous adjustment of the impressed constant current to minor fluctuations in the required total power.

In a further advantageous variant, power values assigned to different operating states of the consumers can be stored in the means for determining the required total power. In an advantageous development of this variant, the consumers can exhibit a control, a propulsion drive and one or more working units, the power values required for their operation being stored in the means for determining the required total power.

To determine the constant current currently being impressed in a route section, current measuring devices can be provided in the route sections.

In a further advantageous variant of the invention, different operating states of the consumers in a route section can be determined and the required total power in this route section can be determined according to the determined operating states. This allows different operating states of the consumers to be linked directly with the total power required by the current sources in the individual route sections on the basis of the previously known power values required there. In one advantageous development of this variant, the operating states can comprise a control state of the consumer with a first power value, a propulsion state of the consumer with a second power value and/or a working state of the consumer with a third power value.

In one advantageous embodiment of the invention, the required total power of at least one of the route sections can be determined from the current operating state of one or more of the consumers.

In one advantageous development, a future required total power of one of the route sections can be determined from a given future operating state of the consumers currently located there. This can be used advantageously when the device is operated controlled, and the means for determining the total power required in each of the individual route sections by the moving consumers located there and the means for actuating the current sources can take account of operating states already known in advance and required total power levels, i.e. from knowledge of the future operating situation, when controlling the device.

In a further preferred embodiment, a future required total power of one of the route sections can be determined from a given future operating state of the consumers located in at least one adjoining route section. This makes it possible to take early account of consumers shortly travelling into a route section when determining the required total power, in particular for future times, so that any switching operations for the constant current fed in can be avoided. This makes it possible to avoid switching losses in the current sources and reduce their load.

BRIEF DESCRIPTION OF THE DRAWINGS

Further particular features and advantages of the invention will become apparent from the following description of a preferred embodiment example with reference to the drawings in which.

DETAILED DESCRIPTION OF THE INVENTION

Figure 1:
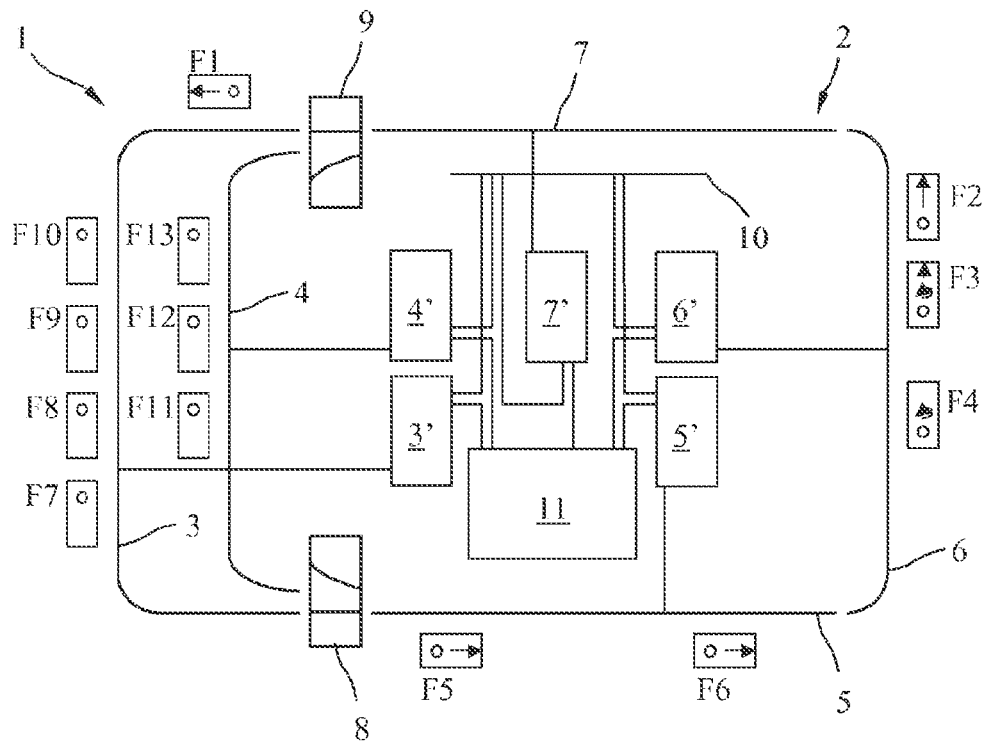
FIG. 1 shows a diagrammatic view of a device according to the invention with a plurality of moving consumers in a first operating state.

FIG. 1 shows a device according to the invention for inductive transmission of electrical energy to moving consumers F1 to F13 in the form of a telpher system 1 known per se with a primary conductor arrangement 2 known per se which runs along a route not shown in the drawing.

The primary conductor arrangement 2 is divided into a total of five electrically separated route sections, a first and second collecting section 3 and 4 respectively, an outward journey section 5, a working section 6 and a return journey section 7. The first and second collecting sections 3 and 4 respectively can be connected mechanically at one end with the outward journey section 7 by means of a set of points 8 and at their other end with the return journey section 7 by means of a set of points 9, without any electrical coupling taking place.

The individual route sections 3 to 7 arc in each case supplied by their own current sources 3' to 7' which impress a constant electric current of different intensity in the route sections 3 to 7 according to need. As the transmission of energy to the consumers F1 to F13 is carried out inductively, the constant current is an alternating current which produces an alternating magnetic field. The current sources 3' to 7' can be produced in a manner known per se and for their part are connected to a three-phase 50 Hz/400 V electrical energy supply network 10. The current sources 3' to 7' are also connected with an installation control 11 which monitors the entire operation of the device 1 and in particular controls the current sources 3' to 7'.

The installation control 11 represents a means for determining the total power required in each case in the individual route sections 3 to 7 by the moving consumers F1-F13 located there and a means 11 for actuating the current sources 3' to 7' to impress the constant electric current corresponding to the required total power of the respective route section 3 to 7 and for its part can be connected with a higher level plant control not shown in the drawing. The installation control 11 can be constructed in the conventional way centrally on one computer or decentrally on distributed computers. In the present case, the installation control 11 can actuate the current sources so that they supply a constant current of the maximum current intensity $I_{VL}$ at full load and current intensities of a third or half the maximum current intensity $I_{VL}$ at lower loads.

The telpher system 1 also exhibits a plurality of moving consumers in the form of cars F1 to F13 operated by electric motor, as used for example in the manufacture of motor vehicles. The inductive supply of electrical energy to the cars F1 to F13 is provided in a manner known per se by means of the primary conductor arrangement 2 running along the route and secondary pickup devices arranged on the cars F1 to F13. The cars F1 to F13 in each case exhibit an electrical propulsion drive, a car control and electrically operated working units, e.g. gripping, lifting or turning devices for vehicle body parts to be worked on by further working installations in the working section 6.

The power values for different operating states for a car F1 to F13 are in the present case approx. 200 W for the car control, approx. 1000 W for the propulsion drive and approx. 2000 W for the working and turning movement of the working unit. Thus, a resting car F1 to F13 only requires 200 W for the car control, a travelling car approx. 1200 W for car control and propulsion drive, a stationary working car approx. 2200 W for car control and working unit and a travelling working car approx. 3200 W. Depending on need, the individual operating states can occur simultaneously, and then the power required by the individual car is determined by adding together the different power values for the individual operating states.

Figure 2:
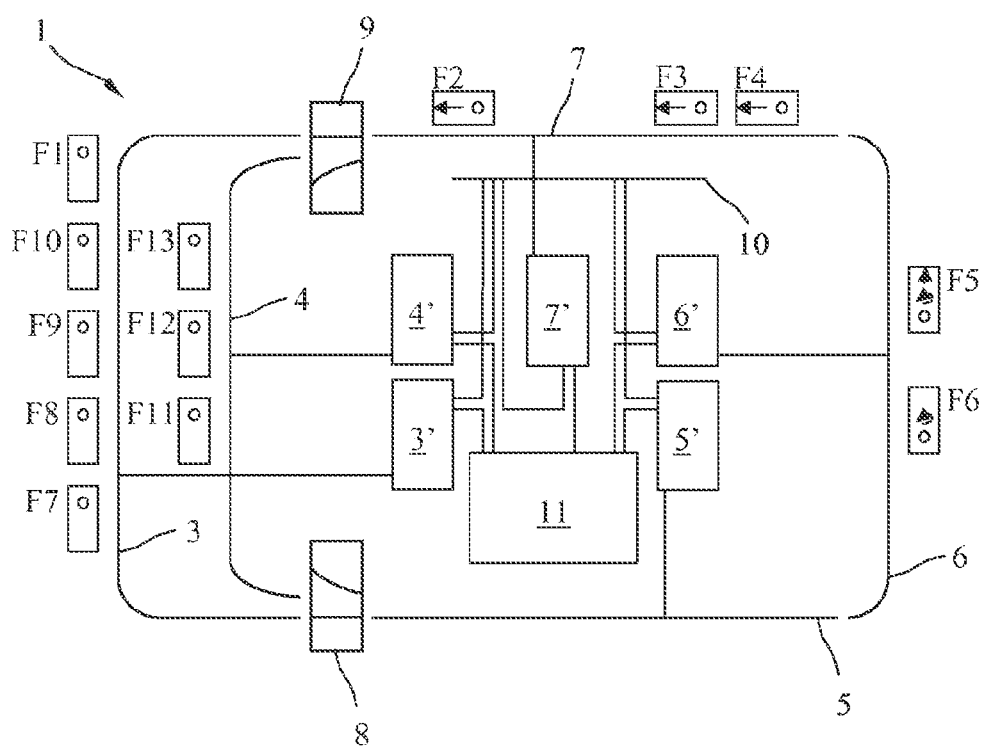
FIG. 2 shows the diagrammatic illustration in FIG. 1 with the moving consumers in a second operating state.

In FIG. 1 a car F1 is already in the first collecting section 3 and travelling to a waiting (standby) position shown in FIG. 2. During its travel, the propulsion drive of the car F1 and its car control are in operation and these are supplied with electrical energy from the current source 3'. Further cars F7 to F10 in the first collecting section 3 are in a waiting (standby) position so that only their car control is in operation. In FIGS. 1 and 2 the operation of the propulsion drive of a car F1 to F13 is marked by a straight arrow "←" and the operation of the car control by a circle "○". To supply the cars F1 and F7 to F10, the first collecting section 3 is supplied with only half the maximum constant current $I_{VL}$ by the associated first current source 3'.

The second collecting section 4 in FIG. 1 only contains three "resting" vehicles F11 to F13, and therefore only requires a third of the maximum constant current $I_{VL}$ to supply their car controls with electrical power from the current source 4'. Thus, the total power required there is three times the amount of power required to operate a car control.

Vehicles F5 and F6 in FIG. 1 are on the outward journey section 5 and moving to the working section 6. As the two vehicles F5 and F6 only require the power required for the propulsion drive and car control, it is sufficient to supply the outward journey section 5 with only half the maximum constant current $I_{VL}$ from the current source 5'.

Cars F2, F3 and F4 in FIG. 1 are in the working section 6, in which car F2 is moving forwards with its propulsion drive and car control in operation, car F3 is moving forwards and carrying out a turning movement indicated by a rotating arrow "♭" with one working unit, while car F4 is stationary and its working unit is carrying out a turning movement. The turning movement of the working units of cars F3 and F4 requires additional power compared to the simple propulsion drive of car F2. The working section 6 is consequently supplied with the maximum constant current $I_{VL}$ by the current source 6'.

In contrast, the completely empty return journey section 7 can be switched to a completely currentless and voltageless state, so the current source 7' does not supply current to the return journey section.

In FIG. 2 the car F1 is also in a waiting (standby) position, so there is no longer any need to supply any power for its propulsion drive. The current source 3' of the first collecting section 3 can then be reduced from half to a third of the maximum constant current $I_{VL}$. This saves additional power as the losses from the constant current in this collecting section 3 can be reduced again. The state in the second collecting section 4 remains unchanged.

As the cars F2 to F4 in FIG. 2 have travelled out of the working section 6 and moved into the return journey section 7, but the working units are no longer carrying out any turning movement, the return journey section 7 is only supplied with half the maximum constant current $I_{VL}$ by the current source 7' to supply the propulsion drives and car controls of the cars F2 to F4. In contrast, in FIG. 2 the cars F5 and F6, which have travelled out of the outward journey section 5, are in the working section 6 where their working units are now both carrying out a turning movement so that there the required total power is the maximum and as before the maximum constant current $I_{VL}$ must be provided. In contrast, the outward journey section 5 is now free of cars so that it no longer has to be supplied with power from the current source 5' and thus can be switched to a currentless and voltageless state by the installation control 11.

Figure 3:
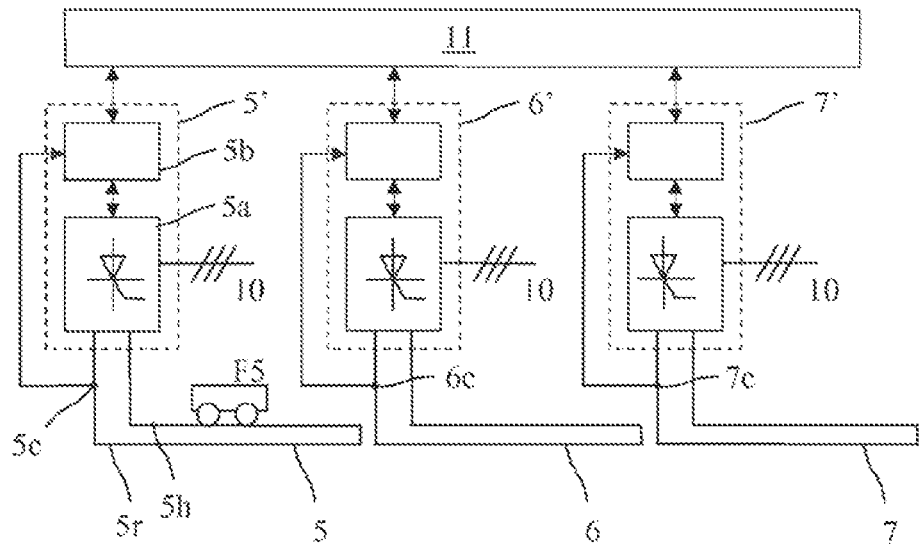
FIG. 3 shows a diagrammatic illustration of a part of a device according to the invention.

FIG. 3 shows diagrammatically a part of the electrical system of the embodiment according to FIGS. 1 and 2. The three route sections 5, 6 and 7 are shown here by way of example, but the design of the other route sections 3 and 4 is the same. As the route sections 3 to 7 are of identical design, the route section of the outward journey section 5 in which a single car F5 is located in FIG. 3, is described in the following by way of example.

The outward journey section 5 exhibits as primary conductor arrangement 2 an outward line 5h known per se and a return line 5r. The secondary pickup device of the car F5 which is not shown in FIG. 3 is guided along the outward line 5h so that electrical energy is transmitted to the car F5 inductively. The electrical energy for the outward line 5h is provided by a power module 5a of the current source 5'. The power module 5a is embodied in a manner known per se as an inverter which is supplied from the voltage system 10. The power module 5a is actuated by a power control 5b which as input signals receives both the operating parameters of the power module 5a, the current in the outward journey section 5 measured at the return line 5r by means of a current measuring device 5c known per se, and control signals from the installation control 11.

The installation control 11 transmits start, stop and other operating signals for the cars F1 to F13 to the power control 5b, i.e. in the present embodiment example determines all the functions for the operation of the cars F1 to F13. This also includes signals for the route sections to be travelled, the places and times at which loads are to be lifted, set down or turned etc. In an alternative embodiment, the cars F1 to F13 can also be equipped with an "intelligent" car control which only receives instructions for tasks to be carried out from the installation control 11 on a higher command level and then plans and executes these on its own.

However, the installation control 11 also receives messages, e.g. status or error messages from the current sources 3' to 7', data on the electrical states and values of the current sources 3' to 7', data on the power, current and voltage conditions prevailing in the individual route sections, when applicable data on the current operating states of the cars F1 to F13, e.g. where a car is actually located at that moment, which functions it is just executing, etc.

The transmission of the signals between the installation control 11, power control 5b and/or cars F1 to F13 can be carried out in a manner known per se by cable, without contact by means of inductive coupling between the suitably equipped route and cars F1 to F13 or even by wireless communications means.

The installation control 11 also determines the total power required at any moment in individual route sections, for which it uses the current measurement of the current measuring device 5c and the current measuring devices of the other route sections. In an alternative embodiment the installation control 11 can also calculate the required total power from the current and when applicable future operating states of the cars F1 to F13 known to it so that current measurement can be eliminated.

For example when the installation control 11 finds that no car F1 to F13 is present in a route section 3 to 7, it switches the route section concerned to a voltageless and currentless state.

On the other hand, when the installation control 11 establishes that one or more cars F1 to F13 are present in a route section, it determines the required total power in this route section 3 to 7 on the basis of the data known to it, i.e. of the cars F1 to F13 present there, and then actuates the current source 3' to 7' concerned so that the constant current fed in safely covers this total power. To avoid continuous adjustment of the constant current, preferably a plurality of supply levels can be defined between which the required total power of the route section 3 to 7 concerned is determined depending on the total power currently required by the cars F1 to F13 located there and preferably also their future operating states, and then a corresponding constant current is fed in. In the present case, four supply levels are defined: supply level 1 corresponds to no power required, supply level 2 corresponds to a third and supply level 3 to half the maximum required total power and thus the maximum constant current at full load. Supply level 4 corresponds to the required total power or constant current at full load. However, more or fewer supply levels can be defined as required.

In FIG. 1 there is no car in the return journey section 7, so that supply level 1 applies there, the return journey section 7 is voltageless and currentless. In the second collecting section 4 it is only necessary to supply the individual car controls of the cars F11 to F13, i.e. supply level 2 with a third of the constant current $I_{VL}$ at full load is sufficient. On the other hand, in the first collecting section 3 the car controls of the four resting cars F7 to F10 and the travelling car F1 and its propulsion drive must be supplied so that it is supplied at supply level 3 with half the maximum constant current $I_{VL}$. The same applies to the outward journey section 5 in which the propulsion drive and car control of the cars F5 and F6 must be supplied. In contrast, full load operation applies in the working section 6 due to the operation of the working units of the cars F3 and F4 and the propulsion drive of the cars F2 and F3 so that there supply level 4 is set with the maximum constant current at full load.

To allow the fastest possible adjustment of the supply levels to changing conditions in the telpher system 1, the installation control 11 in particular uses the data known in advance to it or predetermined by it. Thus, in FIG. 1 the installation control 11 uses the travel data of the cars F2 to F4 to recognize that these will probably shortly travel into the return journey section 7 (FIG. 2). It determines the expected power requirement on the basis of the propulsion drives and car controls of the cars F2 to F4 which have then to be supplied and therefore transmits the corresponding signals to the current sources 7' to change to supply level 2 in good time before the car F2 is driven in. This makes it possible to ensure an uninterrupted power supply and thus travelling of the car F2 and the cars F3 and F4 as well.

The same applies to the first collecting section 3, for there the installation control 11 uses the control signals and operating data of the car F1 known to it to determine that this will shortly reach its resting position shown in FIG. 2 and that therefore it is possible to switch from supply level 2 to supply level 1.

As the installation control 11 knows the cars F5 and F6 travelling in the direction of the working section 6 in advance and knows from the activities of the cars F5 and F6 planned there that the power requirement there will still be large, it maintains supply level 4 there.

For a better understanding, the following table shows the power requirement in the individual route sections in FIGS. 1 and 2 (VS: supply level; $I_{VL}$: current at full load):

TABLE 1

| Section | 3 | 4 | 5 | 6 | 7 |
|---|---|---|---|---|---|
| FIG. 1 | VS 3 (1/2 $I_{VL}$) | VS 2 (1/3 $I_{VL}$) | VS 3 (1/2 $I_{VL}$) | VS 4 ($I_{VL}$) | VS 0 |
| FIG. 2 | VS 2 (1/3 $I_{VL}$) | VS 2 (1/3 $I_{VL}$) | VS 0 | VS 4 ($I_{VL}$) | VS 3 (1/2 $I_{VL}$) |

Figure 4:
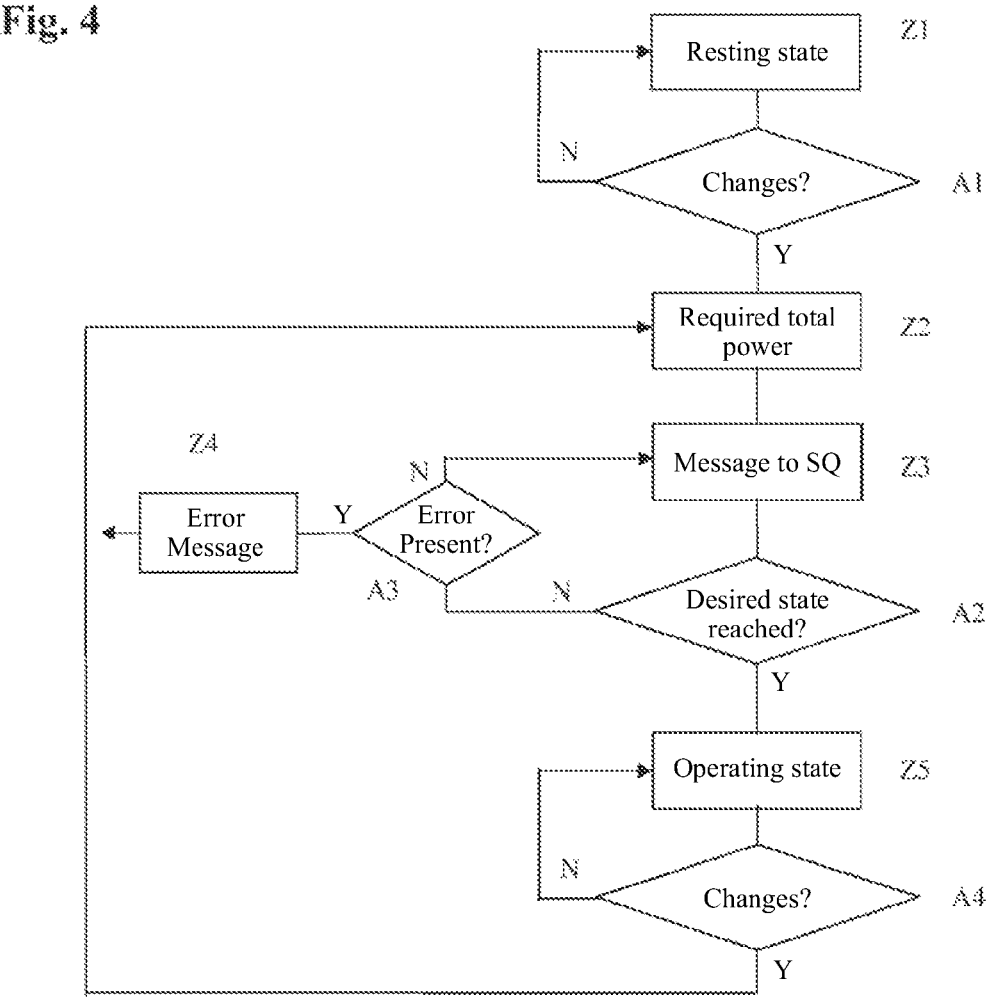
FIG. 4 shows a flow diagram for the operation of the device according to the invention.

FIG. 4 shows an example for the control process in the installation control 11.

In state Z1 the telpher system 1 is in the resting state, the individual route sections 3 to 7 are currentless and voltageless. Interrogation stage A1 continuously monitors whether a change occurs or not. A change can be for example the start of operation of the telpher system 1 after a standstill or an emergency stoppage. As long as no change occurs, the telpher system 1 remains in the resting state. Now if interrogation stage A1 reveals a change, for example a signal to start operation from the installation control 11 or a higher level plant control not shown, the system switches to the state Z2 and there the required total power in the individual route sections 3 to 7 is determined. This is done using the data on the individual cars F1 to F13 present in the installation control 11 and/or data transmitted from these to the installation control 11.

In one advantageous embodiment, different operating states of the individual cars F1 to F13 can be linked with different power values in the installation control 11, e.g. in an assignment table, for faster actuation. This then allows rapid comparison of the current operating states of the individual cars F1 to F13 in a route section 3 to 7 with the power already provided there to determine whether there is a need to change this power.

In an alternative embodiment, when restarting from the resting state Z1 every route section 3 to 7 can also be supplied with the maximum constant current needed for operation at full load in order to ensure that the telpher system 1 is set in operation reliably independently of the current state of the individual route sections 3 to 7 and the cars F1 to F13. This can be expedient above all when restarting after an emergency stoppage.

Then, the installation control 11 transmits the required total power of the individual route sections 3 to 7 determined in the state Z2 to the associated current sources 3' to 7' for the adjustment (SQ in FIG. 4). Then, in interrogation stage A2 the installation control 11 checks whether the desired state of provision of the energy supply has been reached in the individual route sections 3 to 7.

If not, i.e. if the state of provision of the desired energy supply is not confirmed by one or more of the current sources 3' to 7' in interrogation stage A2, firstly the respective current source 3' to 7' is checked for a fault in interrogation stage A3. If a fault is present, then in state Z4 an error message is sent to the installation control 11 and this initiates a suitable measure. If no fault is present any longer in interrogation stage A3, the system returns to state Z3 and the required total power is transmitted again to the respective energy supply devices 3' to 7', preferably only to the route sections 3 to 7 which are not as yet ready in interrogation stage A2.

If the total power required in the route sections 3 to 7 is available in interrogation stage A2, i.e. the corresponding constant current is flowing in the primary conductor arrangement 2 of the route sections 3 to 5, the cars F1 to F13 switch to the operating state Z5 predetermined by the installation control 11, as shown in FIG. 1.

The telpher system 1 is now in the normal state Z5, in which the installation control 11 actuates the individual cars F1 to F13. The state Z5 is monitored continually by the installation control 11 in interrogation state A4. As long as no changes occur, the state Z5 is maintained. If changes occur, for example the car F1 comes to its resting position in FIG. 2, the installation control 11 in state Z2 determines the required total power in the route sections 3 to 7 again. Then, in the state Z3 it emits a corresponding message with the required total power to the current sources 3' to 7' which then provide the required total power as described above. Preferably the message with the changed required total power is only sent in the affected route sections 3 to 7. Thus, in the present embodiment example according to FIGS. 1 and 2 and according to table 1, no message would be sent to the current sources 4' and 6' in the state Z3 as there the required total power has not changed.

The invention claimed is:

1. Device for inductive transmission of electrical energy to moving consumers which can be made to travel along a route with a primary conductor arrangement running along the route and divided into route sections which are separated from one another electrically, wherein the individual route sections are each assigned at least one current source for impressing a constant current in the respective route sections, wherein a means is provided for determining the total power required in each case in the individual route sections by the moving consumers located in the route sections and a means for actuating the current sources for impressing the constant electrical current corresponding to the required total power of the respective route section, wherein power values assigned to the different operating states of the consumers are stored in the means for determining the required total power, and wherein the consumers include a vehicle control, a propulsion drive and one or more working units the power values required for operation being stored in the means for determining the required total power.

2. Device according to claim 1, wherein the means for determining the required total power comprises an assignment table in which different supply levels of the required total power in a route section are assigned values of the constant current to be impressed in the route section, the values for the constant current in each case corresponding to the greatest required total power in a corresponding supply level.

3. Device according to claim 1, wherein the route sections are assigned current measuring devices for determining the constant current currently being provided for the respective route section.

4. Method for inductive transmission of electrical energy to moving consumers which can be made to travel along a route and which are supplied inductively with electrical energy from a primary conductor arrangement running along the route and divided into route sections which are separated from one another electrically, wherein a constant current is impressed on the individual route sections in each case from at least one current source assigned to the respective route section, wherein the total power required by the moving consumers located in the route sections is determined for each route section and a constant electrical current corresponding to the total power required there is impressed on the respective route section by the associated current source, wherein different operating states of the consumers in a route section are determined, and the required total power in this route section is determined according to the determined operating states, and wherein the operating states comprise a control state of the consumer with a first power value, a propulsion state of the consumer with a second power value and/or a working state of the consumer with a third power value.

5. Method according to claim 4, wherein different total powers in a route section are assigned to different supply levels, wherein a supply level is selected according to the determined required total power in a route section and a value for the constant current to be assigned to the selected supply level in the route section is impressed on the route section.

6. Method according to claim 5, wherein the values for the constant current to be assigned to the individual supply levels in the route section in each case correspond to the maximum total power in this supply level.

7. Method according to claim 4, wherein a future required total power of one of the route sections is determined from a given future operating state of the consumers currently located in the route section.

8. Method according to claim 4, wherein a future required total power of one of the route sections is determined from a given future operating state of the consumers located in at least one adjoining route section.

* * * * *